United States Patent
Grimm et al.

(10) Patent No.: US 6,491,341 B2
(45) Date of Patent: Dec. 10, 2002

(54) COMPOSITE ASSEMBLY UNIT FOR VEHICLE BODIES AS WELL AS A METHOD AND AN APPARATUS FOR PRODUCING IT

(75) Inventors: Rainer Grimm, Frankfurt (DE); Horst Böhm, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 09/917,405

(22) Filed: Jul. 27, 2001

(65) Prior Publication Data
US 2002/0105210 A1 Aug. 8, 2002

(30) Foreign Application Priority Data
Jul. 28, 2000 (DE) .......................... 100 36 816

(51) Int. Cl.⁷ .................................. B60J 10/10
(52) U.S. Cl. .................. 296/216.09; 49/480.1
(58) Field of Search ............ 296/216.06, 216.09; 49/493.1, 480.1, 489.1

(56) References Cited

U.S. PATENT DOCUMENTS 5,409,290 A    4/1995  Grimm et al.

FOREIGN PATENT DOCUMENTS

| DE | 43 26 013 A1 | 2/1995 | | |
|---|---|---|---|---|
| DE | 196 30 177 A1 | 1/1998 | | |
| DE | 199 23 725 C1 | 7/2000 | | |
| EP | 1086882 | * | 7/2000 | |
| JP | 401215622 | * | 8/1989 | ............ 296/216.09 |
| JP | 405050887 | * | 3/1993 | ............ 296/216.09 |

OTHER PUBLICATIONS

European Search Report dated Feb. 12, 2002.

* cited by examiner

*Primary Examiner*—Dennis H. Pedder
(74) *Attorney, Agent, or Firm*—Carlson, Gaskey & Olds

(57) ABSTRACT

A composite assembly unit for closing an aperture in a vehicle body, in particular a glass cover for a sliding roof, comprises a flat base body, preferably a glass or plastic pane, having an outside face and an inside face, and a seal for sealing a gap between the composite assembly unit and the vehicle body. The seal has a sealing section and a fixing section, and being attached to the base body by means of plastic foam. The fixing section of the seal is pressed under elastic deformation by the plastic foam against the inside face of the base body so that the sealing section of the seal terminates substantially flush with the outside face of the base body. The result is a composite assembly unit in which a defined, in particular flush, relative position between the flat base body and the seal can be guaranteed in a simple way. A method and an apparatus for producing such a composite assembly unit in a simple way is also described.

14 Claims, 1 Drawing Sheet

COMPOSITE ASSEMBLY UNIT FOR VEHICLE BODIES AS WELL AS A METHOD AND AN APPARATUS FOR PRODUCING IT

DESCRIPTION OF THE PRIOR ART

This invention concerns composite assembly units for vehicle bodies and a method and an apparatus for producing such composite assembly units. In particular, the invention concerns a glass cover for sliding roofs of the type fitted in mass produced cars.

The composite assembly units designed in accordance with the invention are basically suitable for all external and internal plate-like or pane-like structures in vehicle bodies whether transparent or opaque, including hoods, doors and lids/covers. If the following text constantly refers to vehicle roofs and vehicle roof components, this is so because this is in fact the preferred application for the invention without, however, meaning to put a limit to its application. Furthermore, the term "sliding roof" is not intended to extend to those structures alone in which the panel, after lowering its rear edge to open the roof, can slide underneath the rear fixed roof panel but also to sliding roofs where at least one of the panels can be swung from its closed position at the pivot point provided near its front edge to swing it up above the fixed roof panel. Swing-out lids similar to ventilation flaps hinged at the front and what are called top ridge sliding roofs where, after lifting it rear edge the panel is partly slidable over the rear fixed roof panel to open the roof, are also to be included.

Such composite assembly units as a rule require a seal at adjoining vehicle body parts or other covers/panels. Such a seal can be a permanent seal at an adjoining vehicle body part formed after fitting the composite assembly unit in question, for example the edge seal of a prefabricated roof module against the roof frame of a vehicle body or a temporary seal of the composite assembly unit against an adjoining body component, as is found for example between the cover and the roof opening edges of a sliding roof structure in a vehicle.

Seals in the designs in question are as a rule arranged at the edges or near the edges of the composite assembly units to prevent ingress of moisture and/or dirt into gaps between adjoining vehicle body parts. According to the state of the art, rubber-like seal sections are fitted for this purpose to protrusions or edges of the composite assembly unit (FR 2 529 844 A, DE 44 22 176 C1) or inserted into grooves provided on the composite assembly unit (DE 196 37 793 C1) so that they rest tightly against the adjoining vehicle body part when the composite assembly unit is fitted in position. In the case of other known versions, grooves are provided in the composite assembly unit to take adhesive beading to seal the composite assembly unit at the adjoining vehicle body part (DE 32 02 594 C2). Arrangements are also proposed in which seals are placed between the composite assembly unit and the vehicle body part during assembly (DE 29 29 915 A1, DE 79 29 367 U1). The need for fitting the necessary seals/seal sections after producing the composite assembly units in an expensive way in additional stages before fitting at the vehicle body is common to all these arrangements.

Therefore, a composite assembly unit for vehicle bodies has already been proposed in the same applicant's earlier patent application DE 199 46 008 A1, where a rigid layer and a layer of plastic foam is applied to the inner side of the rigid layer, a seal being applied with foam to the edge of the plastic layer. As a result, after applying foam to the plastic layer on the inside of the rigid layer, the composite assembly unit is already provided with an integrated seal. Therefore, the need for forming a locating edge or protrusion at the composite assembly unit and fitting an additional seal initially provided separately onto the finished composite assembly unit is eliminated to advantage, making it possible to produce a ready-to-fit composite assembly unit at a low cost. The same applies to the design known from document DE 43 26 013 A1.

Finally, document DE 196 30 177 A1 discloses a rigid lid for closing an opening in a vehicle body. The lid has a flat base body, preferably made from a transparent material, the edge portion of which is provided with a frame made from plastic. Further, a surrounding seal for sealing a gap between the lid and the vehicle body is mounted to the lid. The seal comprises a sealing section and a fixing section, the latter being inserted between the base body and the plastic frame. An elastic deformation of the fixing section between the base body and the plastic frame cannot be taken from this prior art.

Further problems which occur with the abovementioned versions emerge due to the fact that the seals placed over or into the composite assembly unit can protrude out of the composite assembly unit to the outside of the vehicle body due to unavoidable tolerances. This projecting seal results in, for example, rain water possibly being retained over vehicle body areas delineated by such seals; an undesirable layer of dirt remains over such areas of the body after this water evaporates. On the other hand, the protruding seal forms an undesirable noise-generating edge. Remedy could only be found here so far by applying an expensive method of grinding the seal off or grinding it down flush after assembly at the composite assembly unit.

SUMMARY OF THE INVENTION

The object of this invention is to create a composite assembly unit at which a defined, in particular flush finish position between the flat base body and the seal can be guaranteed by simple means, and a method and an apparatus for producing such a composite assembly unit in a simple way.

According to the invention, a composite assembly unit for closing an aperture in a vehicle body, in particular a glass panel for a sliding roof, comprises a flat base body, preferably a glass or plastic pane, having an outside face and an inside face, and a seal for sealing a gap between the composite assembly unit and the vehicle body, the seal having a sealing section and a fixing section, and being attached to the base body by means of plastic foam, wherein the fixing section of the seal is pressed under elastic deformation by the plastic foam against the inside face of the base body so that the sealing section of the seal terminates substantially flush with the outside face of the base body.

The following stages are envisaged within the method of manufacturing the composite assembly unit according to the invention:
  placing the base body and the seal in a foam application tool,
  holding the sealing section of the seal substantially flush with the outside face of the base body,
  pressing the fixing section of the seal to the inside face of the base body, and
  attaching the seal to the base body by applying the plastic foam and removing the composite assembly unit from the foam application tool.

The apparatus for implementing this method according to the invention has finally a foam application tool comprising two mold halves for accommodating the base body and the seal, the mold half imparting a shape to the plastic foam having a protrusion in the area of the seal forcing the fixing section of the seal against the inner face of the base body when the foam application tool is closed, while the other half of the mold has a retaining section in the area of the seal, which holds the sealing section of the seal substantially flush with the outside face of the base body when the foam application tool is closed.

As a result, by flexibly pressing the fixing section of the seal against the inside face of the base body, which goes hand in hand with an appropriate elastic deformation of the fixing section, the tolerances between the participant parts are compensated, thus taking care of a constant, accurate and mainly flush finish on the outside between the base body and the seal without any additional expensive operations having to be done to achieve this. Thus, not only is the seal affixed to the base body by applying foam at the back but a specific relative position between the base body and the seal is also achieved when the composite assembly unit is produced to advantage in a single operation (what is called a "one-shot-system").

The sealing section of the seal can rest directly on the edge of the base body. The direct contact of the seal with the base body is not only satisfactory from the point of view of appearance. This arrangement also takes up very little space which in the case of a glass panel of a sliding roof not only provides the advantage of a larger viewing area but also reduces the dimension of the gap between the panel and the vehicle body.

The seal can be annular and, when not fitted to the base body, can have a length measured on the inside of the sealing section which is shorter than the peripheral length of the base body edge. This allows the seal to be fitted onto the edge of the base body first simply by flexibly expanding it before the base body and the seal are placed into the foam application tool.

The sealing section of the seal can in principle be formed as a solid section from one material with appropriate elastic properties. However, it is preferred also for reasons of cost and weight that the sealing section has a hollow profile.

The fixing section of the seal can have a plurality of projections on its side facing the inside of the base body, that is, in the form of ribs extending all round, resting against the inside face of the base body. Elastic properties of the fixing section required for reliable tolerance compensation are easy to set at the required level in a specified way by providing the suitable geometry. At the same time, the protrusions provide locally increased surface pressure in the foam application tool between the fixing section of the seal and the base body, thus forming a reliable tight seal between the fixing section and the base body so that the foam which is initially fluid cannot pass through at this point.

The fixing section of the seal can be provided with ribs on its side facing away from the inside face of the base body, which ribs positively and detachably engage in undercut depressions in the plastic foam formed by the application of foam. The fixing section is given what is called a fir-tree profile to ensure secure seating of the seal offering protection against unintentional removal from the hardened plastic foam.

The seal can have a plurality of suitable metallic grid elements distributed over its periphery, stiffening a part section of the sealing section which rests against the edge of the base body, and the fixing section of the seal. These grid elements can be usefully introduced into the seal in production already at the extrusion stage, running simultaneously through the extruder gap in the form of a grid band while being initially connected for example in a symmetrical arrangement by means of a center web before the connecting center web is broken or cut away to form two seal strips which are stiffened but remain elastic in the longitudinal direction. An armored annular seal will be produced by cutting such a seal strip to size and bonding or welding its ends together, capable of being elastically stretched and easily fitted on to the edge of the base body before the base body with the seal on it is introduced into the foam application tool. It is also possible to insert what is known as a longitudinally expandable meander grid strip.

The seal can also have a lip section, also stiffened by grid elements, protruding between the sealing section and the fixing section, the width of the sealing section being adjustable by bending the lip section according to or to suit the width of the gap between the composite assembly unit and the vehicle body.

When applying foam to the base body, the seal can to advantage be a seal element between the mold halves of the foam application tool so that the foam application tool does not need to have its own wearing seal.

A seal can be used consisting of an elastomeric material such as expanded rubber or EPDM (ethylene propylene diene polymethylene) which does not bind when applying the foam material, preferably PUR (polyurethane), allowing the seal to be replaced.

Finally, it must be mentioned with regard to the apparatus that one of the mold halves of the foam application tool can, to advantage, have a bevel in the area of the seal which presses the sealing section of the seal against the edge of the base body when the foam application tool is closed.

In summary, the invention may be defined as follows:

According to a first aspect of the present invention, there is provided a composite assembly unit for closing an aperture in a vehicle body, the unit comprising a flat base body, the base body having an outside face and an inside face, there being a seal for sealing a gap between the composite assembly unit and the vehicle body, the seal having a sealing section and a fixing section, and being attached to the base body by means of plastic foam, wherein the fixing section of the seal is pressed under elastic deformation by the plastic foam against the inside face of the base body so that the sealing section of the seal terminates substantially flush with the outside face of the base body.

According to a second aspect of the present invention, there is provided a method for producing a composite assembly unit for closing an aperture in a vehicle body, the unit comprising a flat base body, the base body having an outside face and an inside face, there being a seal for sealing a gap between the composite assembly unit and the vehicle body, the seal having a sealing section and a fixing section, and being attached to the base body by means of plastic foam, wherein the fixing section of the seal is pressed under elastic deformation by the plastic foam against the inside face of the base body so that the sealing section of the seal terminates substantially flush with the outside face of the base body; wherein the method comprises the following steps:

placing the base body and the seal in a foam application tool, holding the sealing section of the seal substantially flush with the outside face of the base body, pressing the fixing section of the seal to the inside face of the base body, and attaching the seal to the base body by applying the plastic foam and removing the composite assembly unit from the foam application tool.

According to a third aspect of the present invention, there is provided an apparatus for producing a composite assembly unit for closing an aperture in a vehicle body, the unit comprising a flat base body, the base body having an outside face and an inside face, there being a seal for sealing a gap between the composite assembly unit and the vehicle body, the seal having a sealing section and a fixing section, and being attached to the base body by means of plastic foam, wherein the fixing section of the seal is pressed under elastic deformation by the plastic foam against the inside face of the base body so that the sealing section of the seal terminates substantially flush with the outside face of the base body, the composite assembly unit being produced by a method comprising the following steps:

placing the base body and the seal in a foam application tool, holding the sealing section of the seal substantially flush with the outside face of the base body, pressing the fixing section of the seal to the inside face of the base body, and attaching the seal to the base body by applying the plastic foam and removing the composite assembly unit from the foam application tool; wherein the apparatus comprises a foam application tool having two mold halves for accommodating the base body and the seal, one mold half imparting a shape to the plastic foam having a protrusion in the area of the seal which presses the fixing section of the seal against the inside face of the base body when the foam application tool is closed, and the other mold half having a holding section in the area of the seal, which holds the sealing section of the seal substantially flush with the outside face of the base body when the foam application tool is closed.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
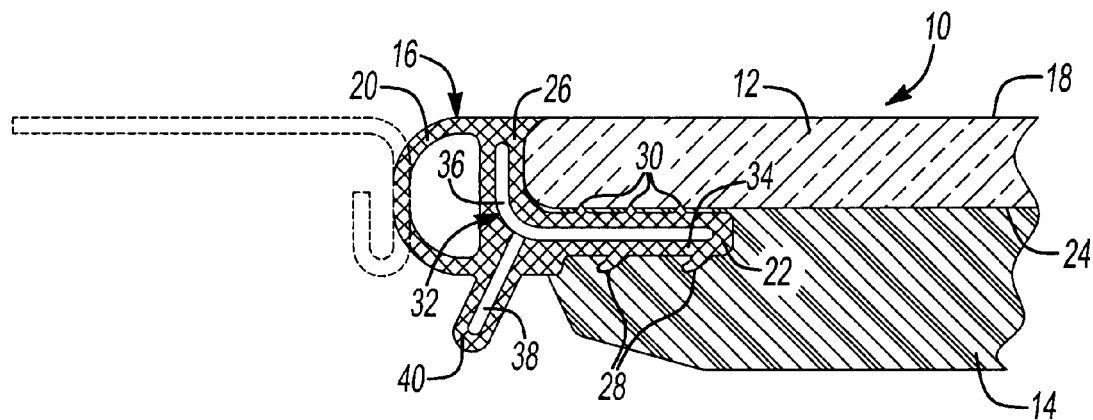
FIG. 1 is a part section through a glass panel of a sliding roof having a foamed plastic edge and an edge gap seal foamed onto the glass panel in accordance with the invention, wherein a folded edge of a roof opening cut out in the vehicle body is outlined by a dot and dash line to shown the position of the glass panel in situ.
Figure 2:
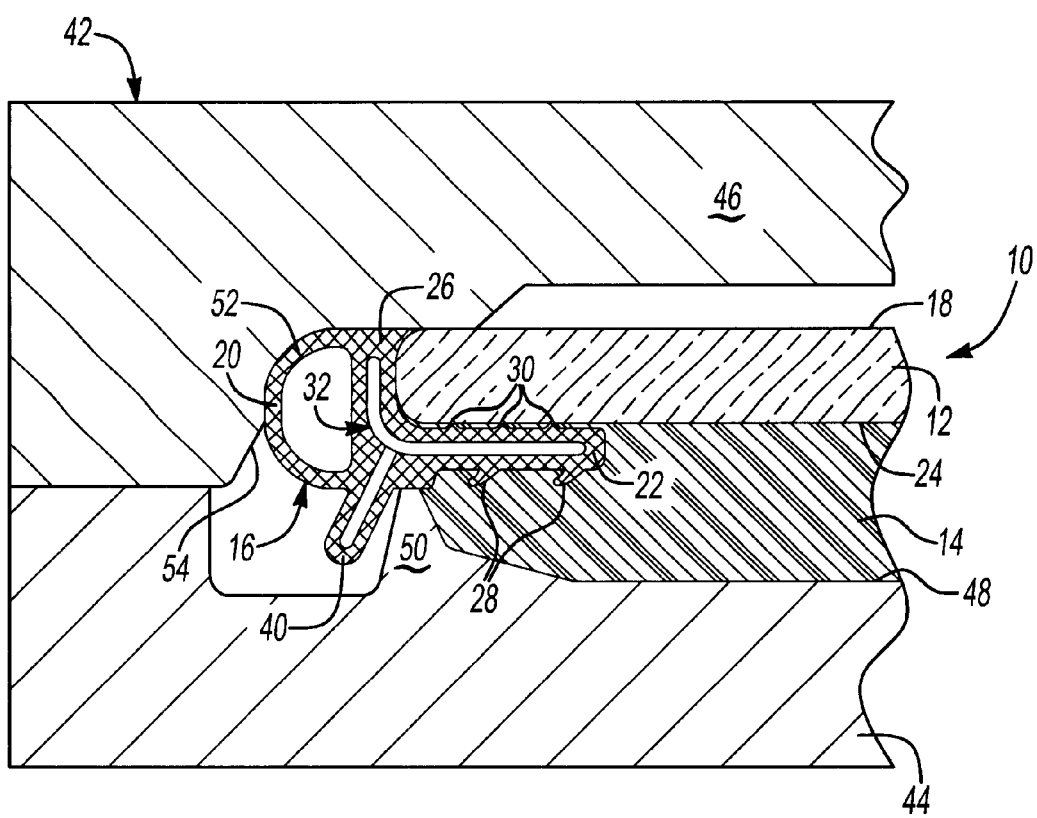
FIG. 2 is a part section through the glass panel as in FIG. 1 during the foam application method in a closed, two-part foam application tool.

FIGS. 1 and 2 show, as a composite assembly unit 10 for closing an aperture in a vehicle body, a glass panel for a sliding roof with a flat base body 12 in the form of a glass or a plastic pane and a seal 16 applied with plastic foam 14 to the base body 12, for sealing a gap between the composite assembly unit 10 and the vehicle body (shown by a dot and dash line in FIG. 1). As described in greater detail below, the seal 16, shown in a simplified form in undeformed condition has a sealing section providing a mainly flush finish with the outside face 18 of the base body 12, and a fixing section 22 which under elastic deformation is pressed by the plastic foam 14 against the inside face 24 of the base body 12.

In the example of design shown here, the seal 16 is a hollow chamber seal where the seal section 20 is enclosing the hollow chamber and the fixing section 22 is designed as a flange which projects from the sealing section 20 and is in one piece therewith. It is clearly evident that only the part area of the seal 16 formed by the fixing section 22 is embedded in the plastic foam 14 when the foam is applied. The seal section 20 of the seal 16 rests here directly at the slightly rounded edge 26 of the base body 12, that is, without any plastic foam 14 being present between the sealing section 20 and the edge 26.

The figures do not show that the seal 16 is altogether annular, its cross section for example being in the main unchanging over the periphery. When not fitted to the base body 12, the length of the seal 16 on the inside of the sealing section 20 is in this case shorter than the peripheral length of the base body edge 26 so that the seal 16 sits elastically expanded or with a preload when fitted to the edge of the base body 12.

The seal 16 can be made from the same elastomeric material over its full cross section which is sufficiently resistant in particular to thermal and mechanical stresses present in the foam application tool and in the condition mounted to the vehicle body—such as expanded rubber or EPDM, or co-extruded with different materials. For example, the sealing section 20 on one side and the fixing section 22 on the other can be of different materials. The seal 16 is preferably formed from a material, at least in the area of the fixing section 22, which does not bind with the plastic foam 14 during its application so that the seal 16 is replaceable.

The fixing section 22 of the seal 16 can be provided on its side facing away from the inside face 24 of the base body 12 with ribs 28 positively and detachably engaging into complementary undercut depressions in the plastic foam 14. This gives the seal 16 firm hold in the plastic foam 14 on the one hand, preventing unintentional loosening of the seal 16 from its foamed-on position. On the other hand, however, the seal 16 can be pulled out from the plastic foam 14 by applying the necessary force against the resistance of the positive hold between the ribs and the depressions when the seal 16 is to be or must be replaced. The depressions in the plastic foam 14 remain in the plastic foam and are capable of again forming a positive contact with the rib of the new fixing section when a complementary fixing section of the new seal is introduced.

On that side of the fixing section 22 of the seal 16, which faces the inside face 24 of the base body 12 the fixing section 22 is provided with a plurality of projections 30 such as ribs extending all round in the case of an extruded profile, resting against the inside face 24 of the base body 12. Apart from the material selected, these projections 30 also contribute to a defined elasticity of the fixing section 22 of the seal 16. Thanks to this elasticity, the existing tolerances can be compensated as the fixing section 22 is being pressed against the inside face 24 of the base body 12 so that with the fixing section 22 suitably compressed, the seal section 20 of the seal 16 which is rather undersized in comparison with the thickness of the base body 12 can form in the main a flush seal with the outer face 18 of the base body 12. On the other hand, these projections 30 seal off the area between the inside face 24 of the base body 12 and the fixing section 22 of the seal 16 and safely prevent the plastic foam, which initially flows like water, from passing between these parts.

The seal 16 is also provided with a plurality of metallic grid elements distributed over the periphery, one of which is shown in each of the illustrations. Since the individual grid elements 32 in the example of design described here are not connected together by metal in a finished seal 16, they do not prevent the seal 16 from expanding in the longitudinal direction or along its periphery.

Each of the grid elements 32 which are fully surrounded by the material of the seal 16 have at least two flexible arms 34, 36 or three flexible arms 34, 36, 38, as in the example of design shown, which are in the main arranged in a T when viewed in cross section. The longest arm 34 of the grid element 32 imparts rigidity to the fixing section 22 of the seal 16. The arm 36 of the grid element 32 extending upwards from the arm 34 in the illustration serves the purpose of imparting rigidity to the part section of the sealing section 20 resting at the edge 26 of the base body 12, its angular position in relation to the arm 34 assisting the sealing section 20 always to rest against the edge 26 of the base body 12. The arm 38 of the grid element 32 extending down from the arm 34 in the illustrations finally imparts rigidity to an optional lip section 40 of the seal 16 which projects down between the sealing section 20 and the fixing section 22. It is evident that the sealing section 20 of the seal 16 can be easily deformed to compensate any deviations in the dimensions of the gap between the composite assembly unit 10 and the vehicle body outlined by the dash and dot line by bending the lip section 40, which can be done without difficulty, until the seal 16 on the composite assembly unit 10 placed in situ rests tightly against the body edge on the vehicle, that is the edge of the opening in the roof.

As can be seen from FIG. 2, the apparatus or fixture for making the composite assembly unit 10 described above has a foam application tool 42 with two mold parts or halves 44, 46 for accommodating the base body 12 and the seal 16, the foam position and the installation position of the composite assembly unit 10 being the same in the example of design shown.

The lower mold half 44 giving the plastic foam 14 a shape by means of a suitably designed hollow space (edge, frame or layer) has a projection 50 in the area of the seal 16, e.g. in the shape of an all-round rib following the shape of the base body 12 which, in a foam application tool 42 preferably closed against a mechanical stop, presses the fixing section 22 of the seal 16 against the inner face 24 of the base body 12.

The other, upper half of the mold 46 of the foam application tool 42 has in the area of the seal 16 a holding section 52, for example in the form of a flat face all round, which, with the foam application tool 42 closed, holds the sealing section 20 of the seal 16 substantially flush with the outer face 18 of the base body 12. One of the mold halves 44, 46 of the foam application tool 42, also the upper mold half 46 in the example of design shown, has furthermore a preferably all-round bevel 54 in the area of the seal 16 which in addition presses the sealing section 20 of the seal 16 against the edge 26 of the base body 12 when the foam application tool 42 is closed.

As can be clearly seen from FIG. 2, the seal 16 has an additional, important purpose during the foaming method. In fact, the seal 16 also performs the task of a sealing element between the mold halves 44, 46 of the foam application tool 42 during application of the plastic foam 14, preventing the foaming plastic not only from escaping from the foam application tool 42 but also from wetting or contaminating the surface of the seal 16 or the base body.

To produce the composite assembly unit 10 described above, the annular seal 16 is first expanded and fitted at the edge 26 of the base body 12 before the base body 12, with the seal 16 fitted to it, is placed in the center of the upper mold half 46 of the foam application tool 42 by, e.g., a robot. The base body 12 is attached to the holding section 52 preferably by vacuum. The foam application tool 42 is then closed, the two mold halves 44, 46 coming to rest against each other. When the foam application tool 42 is closed, the sealing section 20 of the seal 16 is held substantially flush with the outside face 18 of the base body 12 while the fixing section 22 of the seal 16 is pressed by the protrusion 50 against the inside face 24 of the base body 12. At the same time, the centring bevel 54 of the upper mold half 46 presses the sealing section 20 of the seal 16 on the edge 26 of the base body 12. In this positively held position of the seal 16, the hollow space 48 of the foam application tool 42 delineated by the lower mold half 44, the inner face 24 of the base body 12 and the fixing section 22 of the seal 16, is filled in a known way with the initially liquid plastic which hardens to form the plastic foam 14 in the hollow space 48. The finished composite assembly unit 10 is then removed from the foam application tool 42, the sealing section 20 of the seal 16 relaxing away from the edge 26 of the base body 12, while the fixing section 22 of the seal 16 is held in position by the plastic foam 14 where it is pressed against the inside face 24 of the base body 12 so that the seal section 20 of the seal 16 is substantially flush with the outside face 18 of the base body 12 also after the composite assembly unit 10 has been removed from the mold.

In the case of the example of a composite assembly 10 shown in FIGS. 1 and 2, there is a glass panel of a sliding roof, the flat base body 12 of which is formed by the transparent glass or plastic pane. However, the base body of the composite assembly unit could be equally made of opaque metal sheet, e.g. aluminum or steel or a thermoplastic sheet, e.g. a two-layer co-extrusion sheet from PMMA and PC/ASA. The base body can also be a flat composite component fitted with solar cells forming a solar panel.

Furthermore, the plastic foam 14 applied to the transparent base body 12 to form an edge or frame (or to another base body to form a continuous layer) is preferably a PUR foam consisting of a polyol and an isocyanate mixed for example in a ratio of 1:2.

Although the figures do not show it, the applied plastic foam 14 can be armored with such substances as glass fiber, cloth, knitted fabrics, fleece, lattice materials and the like embedded in it, increasing, in conjunction with the flat base body 12, the dimensional stability and strength of the composite assembly unit 10. A stiffening section or frame of metal (not shown) can also be embedded in the plastic foam 14 applied.

We claim:

1. A composite assembly unit for closing an aperture in a vehicle body, comprising:
    a base body having an outside face and an inside face;
    a seal for sealing a gap between the composite assembly unit and the vehicle body, the seal having a sealing section and a fixing section secured to the base body; and
    plastic foam elastically deforming the fixing section of the seal against the inside face of the base body so that the sealing section of the seal terminates substantially flush with the outside face of the base body.

2. A composite assembly unit according to claim 1 wherein the flat base body is a glass panel for a sliding roof.

3. A composite assembly unit according to claim 1, wherein the flat base body is a plastic panel for a sliding roof.

4. A composite assembly unit according to claim 1, wherein a portion of the sealing section of the seal rests directly on an edge of the base body.

5. A composite assembly unit according to claim 4, wherein the seal has a nominal length on the inside of the sealing section which is shorter than the peripheral length of the base body edge.

6. A composite assembly unit according to claim 1, wherein the sealing section of the seal has a hollow cross section.

7. A composite assembly unit according to claim 1, wherein the fixing section of the seal has, on one side facing the inside face of the base body, a plurality of protrusions which rest on the inside face of the base body.

8. A composite assembly unit according to claim 1, wherein the fixing section of the seal is provided with ribs on one side facing away from the inside face of the base body, the ribs detachably engaging depressions in the plastic foam.

9. A composite assembly unit according to claim 1, wherein the seal has a plurality of metallic grid elements which stiffen a portion of the sealing section resting on the edge of the base body, and the fixing section of the seal.

10. A composite assembly unit according to claim 9, wherein the seal has a lip section stiffened by the grid elements, protruding between the sealing section and the fixing section, wherein the width of the sealing section is adjustable to the width of the gap between the composite assembly unit and the vehicle body upon assembly by bending the lip section.

11. A composite assembly unit according to claim 1, wherein the seal forms a sealing element between mold halves of a foam application tool when foaming the seal to the base body.

12. A composite assembly unit according to claim 1, wherein the seal comprises an elastomeric material.

13. A composite assembly unit according to claim 12, wherein the seal comprises expanded rubber.

14. A composite assembly unit according to claim 12, wherein the seal comprises EPDM.

* * * * *